F. A. BOWER.
ANTISKID CHAIN.
APPLICATION FILED JUNE 7, 1919.
1,342,086.
Patented June 1, 1920.
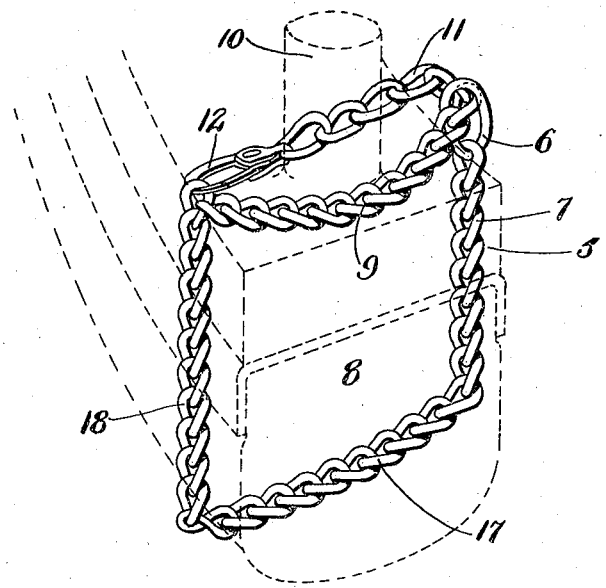
Fig: 1.
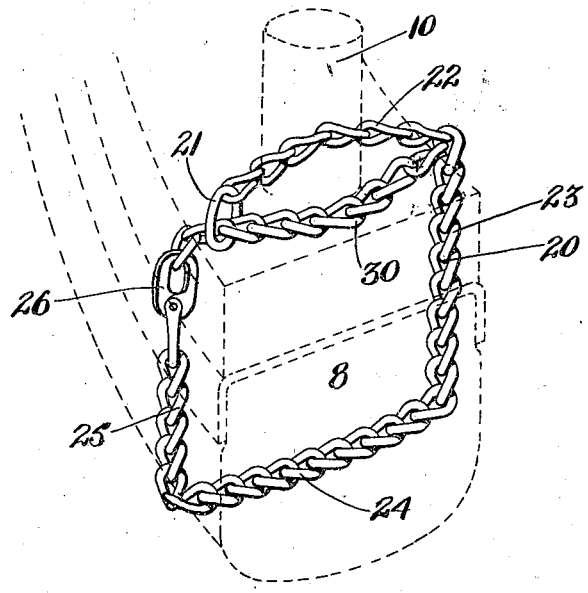
Fig: 2.
Inventor
Frank A. Bower
By his Attorneys
Edwards, Sager & Richmond

UNITED STATES PATENT OFFICE.

FRANK A. BOWER, OF BROOKLYN, NEW YORK, ASSIGNOR TO CHARLES D. SCHMIDT, OF JAMAICA, NEW YORK.

ANTISKID-CHAIN.

1,342,086.  Specification of Letters Patent.  Patented June 1, 1920.

Application filed June 7, 1919. Serial No. 302,579.

*To all whom it may concern:*

Be it known that I, FRANK A. BOWER, a citizen of the United States, residing at Brooklyn, in the county of Kings and State of New York, have invented certain new and useful Improvements in Antiskid-Chains, of which the following is a specification.

This invention relates to antiskid devices for vehicle wheels and particularly to tire chains comprising a short length of chain adapted to surround the wheel rim and to be fastened to a spoke.

The object of the invention is to provide a tire chain which may be quickly secured in place by a single hook and which will remain attached to the wheel spoke in case the tread portion of the chain breaks.

In the accompanying drawings:

Figure 1 is a perspective view of a portion of a wheel in dotted lines with a chain illustrating one embodiment of this invention; and Fig. 2 is a view corresponding to Fig. 1 illustrating a modification.

In the embodiment of the invention shown in Fig. 1 a chain 5 has a loop 6 at one end and is carried at 7, 17 and 18 around the tread of the wheel 8 and at 9 along the inside of the wheel felly at one side of the spoke 10 and then through the loop 6 and at 11 around the other side of the spoke 10 to have its end hooked at 12 to an intermediate portion of the chain. When thus attached this chain is permanently secured to the wheel against loss for upon wear and breakage of any of the tread portions 7, 17 or 18 the chain will still be held from flying off by the loop 9, 11 around the spoke 10.

In the embodiment of the invention shown in Fig. 2 the chain 20 is provided with a loop 21 at one end and is carried around the wheel at 22, 23, 24 and 25 and carries a hook 26 at the other end. An auxiliary chain segment 30 is attached to the chain 20 between portions 22 and 23 thereof and in position on the wheel this auxiliary length 30 passes around the side of the spoke 10 opposite to portion 22 and then through loop 21 and then has one of its links caught by hook 26. The hook 26 is wider than the inner diameter of loop 21 so that this hook cannot pass through this loop. Consequently upon breakage of any of the tread portions 23, 24, or 25, or of the portion 22, the chain will still remain attached to the wheel and will not be lost.

The tire chain of this invention is quickly and easily attached in place by simply passing one end of the chain through the loop and hooking the hook into the proper link to correspond with the size of the wheel tire and felly. In the Fig. 1 form the user holding loop 6 in approximate position passes the hook end of the chain around the tread and through the loop and then fastens hook 12 to the desired link around the other side of spoke 10. In the Fig. 2 form the loop around spoke 10 is preferably first formed by passing the end of length 30 through loop 21; the hook end of the chain is then passed around the tire tread and engaged with the proper link of length 30.

I claim:—

1. The combination with a wheel, of an anti-skid chain adapted to be applied to a wheel, a single loop member permanently connected to one end of a simple length portion of said chain, and a single hook member permanently fastened to the other end of said portion, said chain having a portion passing through said loop to form a chain loop around the wheel spoke and another chain loop around the wheel tread in such manner that the relative sizes of the chain loops are adjustable by said hook member and breakage of said tread loop will leave the chain attached to the wheel by the loop around the spoke.

2. In an anti-skid chain the combination with a chain portion adapted to pass around the tread of a wheel, of a loop member connected to said chain, a single hook member connected to said chain and of such size as not to be passable through said loop member, and a portion of chain adapted to pass through said loop and be engaged by said hook to form a chain loop around the wheel spoke in such manner that breakage of said tread portion will leave the chain attached to the wheel by the loop around the spoke.

FRANK A. BOWER.